United States Patent [19]
Loewe

[11] Patent Number: 5,975,174
[45] Date of Patent: Nov. 2, 1999

[54] RIM MOUNTABLE TIRE INFLATION MAINTENANCE DEVICE

[76] Inventor: Richard T. Loewe, 12882 Olympia Way, Santa Ana, Calif. 92705

[21] Appl. No.: 09/209,538

[22] Filed: Dec. 11, 1998

Related U.S. Application Data

[63] Continuation-in-part of application No. 08/819,792, Mar. 18, 1997, Pat. No. 5,865,917.

[51] Int. Cl.$^6$ .................................................. B60C 23/10
[52] U.S. Cl. .......................... 152/415; 152/418; 152/419; 152/423; 152/424; 152/426
[58] Field of Search .................................... 152/415, 418, 152/419, 423, 424, 425, 426

[56] References Cited

U.S. PATENT DOCUMENTS

| | | |
|---|---|---|
| 442,948 | 12/1890 | Bowley . |
| 535,505 | 3/1895 | Moore . |
| 540,519 | 6/1895 | Stanford . |
| 561,628 | 6/1896 | Tomlinson . |
| 643,017 | 2/1900 | Tucker ..................................... 152/426 |
| 677,710 | 7/1901 | Stacy ....................................... 152/425 |
| 1,029,340 | 6/1912 | Brest ....................................... 152/425 |
| 1,125,678 | 1/1915 | Fernandez ............................... 152/425 |
| 1,128,455 | 2/1915 | Keith . |
| 1,132,167 | 3/1915 | Craw ....................................... 152/425 |
| 1,165,282 | 12/1915 | Pearson ................................... 152/425 |
| 1,200,418 | 10/1916 | Fernandez ............................... 152/425 |
| 1,229,039 | 6/1917 | Crane . |
| 1,312,074 | 8/1919 | Cumming ............................... 152/425 |
| 1,744,405 | 6/1930 | McCord . |
| 1,776,933 | 9/1930 | Simmen . |
| 1,793,429 | 2/1931 | Mascarenhas ........................... 152/425 |
| 1,894,908 | 1/1933 | Hopkins .................................. 152/426 |
| 2,021,646 | 11/1935 | Crandall ................................. 152/425 |
| 2,084,381 | 6/1937 | Campbell ............................... 152/426 |
| 2,211,935 | 8/1940 | Parker .................................... 152/419 |
| 2,214,597 | 9/1940 | Smith ..................................... 152/426 |
| 2,415,618 | 2/1947 | West ...................................... 230/172 |
| 2,536,817 | 2/1951 | Lacroix et al. ......................... 152/425 |
| 2,577,458 | 12/1951 | Gaiptman ............................... 152/416 |

(List continued on next page.)

FOREIGN PATENT DOCUMENTS 1011756  7/1957  Germany .

*Primary Examiner*—D. Glenn Dayoan
*Assistant Examiner*—Long Bao Nguyen
*Attorney, Agent, or Firm*—Stetina Brunda Garred & Brucker

[57] ABSTRACT

A device for maintaining inflation pressure within a tire interior of a tire mounted on a rotating wheel with a rim. The device includes a compressor with piston penetrateably mountable on the wheel rim or in communication with a valve stem that incorporates air delivery to the compressor as mounted within the tire. The piston is in communication with a compressible piston driver having a distal end in contact with the inner floor of the mounted tire where the outer side of the tire contacts the ground once every revolution of the wheel. Repeated deformation of the rotating tire where it contacts the ground outside the distal end of the driver is transferred to the air compressor through a piston compression stroke. When such ground contact is not occurring, centrifugal force causes radial movement to accomplish the intake stroke of the piston. In this repetitious manner a small amount of air is forced into the tire during each rotation thereof when needed to maintain desired inflation pressure.

12 Claims, 5 Drawing Sheets

U.S. PATENT DOCUMENTS

| | | | |
|---|---|---|---|
| 3,099,309 | 7/1963 | Horta | 152/416 |
| 3,511,294 | 5/1970 | Bepristis | 152/418 |
| 4,154,279 | 5/1979 | Tsuruta | 152/416 |
| 4,269,252 | 5/1981 | Shapiro | 152/426 |
| 4,313,483 | 2/1982 | Brockmann | 152/416 |
| 4,418,737 | 12/1983 | Goodell et al. | 152/416 |
| 4,570,691 | 2/1986 | Martus | 152/332.1 |
| 4,582,107 | 4/1986 | Scully | 152/417 |
| 4,583,566 | 4/1986 | Kalavitz | 137/101.19 |
| 4,598,750 | 7/1986 | Gant | 152/416 |
| 4,619,303 | 10/1986 | Bryan et al. | 152/416 |
| 4,685,501 | 8/1987 | Williams | 152/417 |
| 4,705,090 | 11/1987 | Bartos | 152/417 |
| 4,742,857 | 5/1988 | Gandhi | 152/418 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,840,212 | 6/1989 | Wei | 152/419 |
| 4,875,509 | 10/1989 | Da Silva | 141/38 |
| 4,924,926 | 5/1990 | Schultz et al. | 152/417 |
| 5,325,902 | 7/1994 | Loewe et al. | 152/419 |
| 5,472,032 | 12/1995 | Winston et al. | 152/415 |
| 5,505,080 | 4/1996 | McGhee | 73/146.5 |
| 5,556,489 | 9/1996 | Curlett et al. | 152/418 |
| 5,558,730 | 9/1996 | Olney et al. | 152/418 |
| 5,591,281 | 1/1997 | Loewe | 152/418 |
| 5,616,196 | 4/1997 | Loewe | 152/426 |
| 5,667,606 | 9/1997 | Renier | 152/421 |

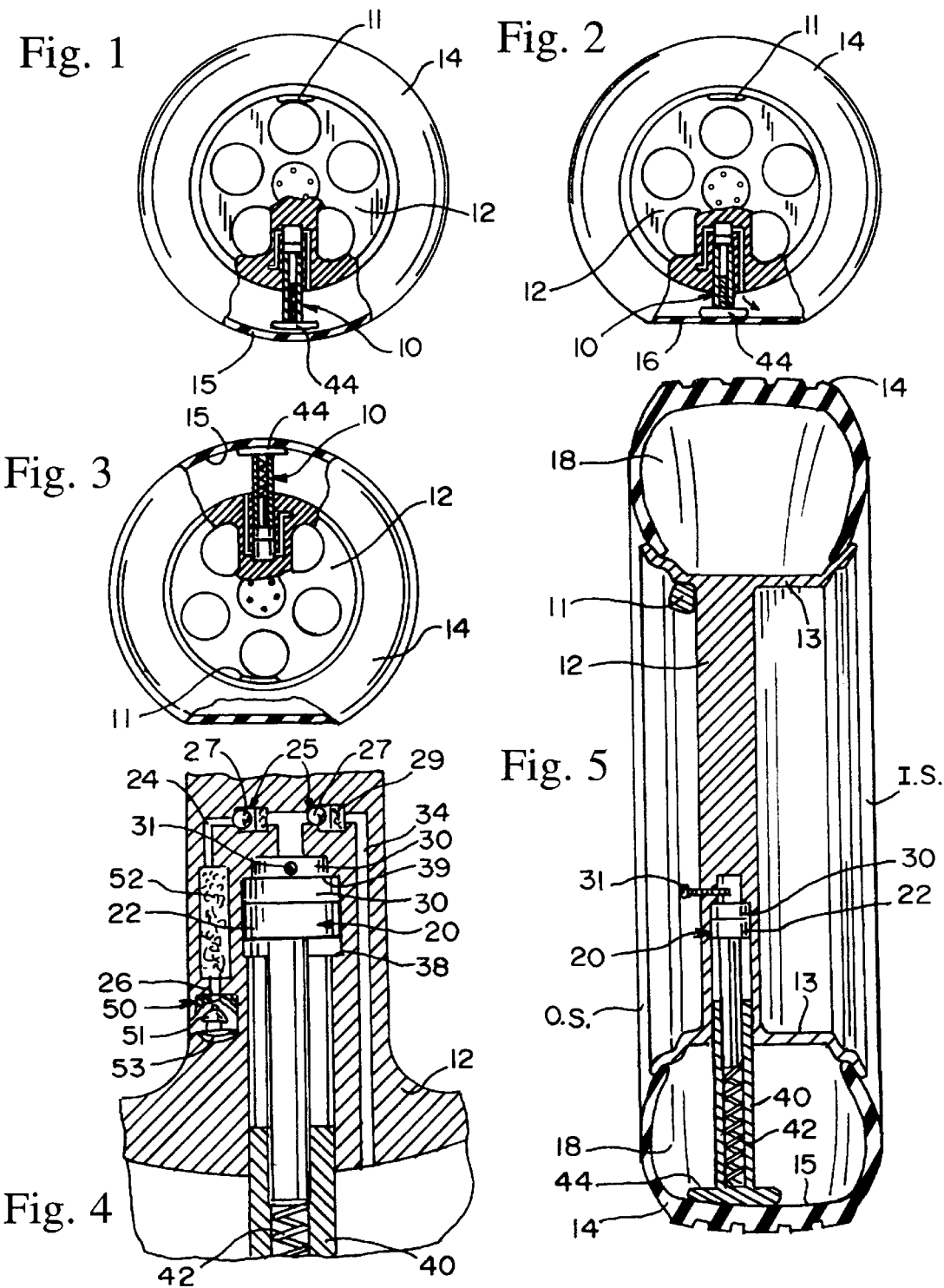

RIM MOUNTABLE TIRE INFLATION MAINTENANCE DEVICE

CROSS-REFERENCE TO RELATED APPLICATION

This application is a continuation-in-part of U.S. application Ser. No. 08/819,792 filed Mar. 18, 1997 now U.S. Pat. No. 5,865,917.

FIELD OF THE INVENTION

The present invention relates generally to fluid pressure control apparatus, and more particularly to an automatic tire pressure inflation device which is contained in association with a vehicle wheel for maintaining a desired inflation pressure within a tire mounted on said wheel.

BACKGROUND OF THE INVENTION

Maintaining correct inflation pressure in vehicle tires is accepted as an effective way to increase fuel economy, decrease tire wear and increase safety. Although proper tire inflation may be maintained by regularly checking tire pressure and adjusting accordingly, such maintenance tends to be largely ignored because of the inconvenience involved. Studies show that a tire will lose one to two psi of pressure per month in cool weather and more in warmer weather. Such resulting under-inflated tires not only cause fuel waste and excessive tire wear, estimated to cost over ten billion dollars annually in the United States alone, but also cause thousands of traffic accidents annually.

Prior art devices depending on tire deformation to move a piston and thereby activate a compressor located on a wheel generally transfer deformation motion directly to piston motion through rigid members, with larger deformations urging proportionately larger piston strokes. However, because an adequate compression ratio must be provided by a piston stroke for a slightly under-inflated tire that deforms only a fraction of an inch, an effective piston stroke must be provided by piston movement not exceeding a fraction of an inch. As is evident, when a tire is significantly under-inflated, direct coupling of deformation urges a piston movement far beyond its needed stroke length, thereby causing breakage of the rigid member or damage to the tire during each revolution as the rigid member bears the entire weight borne by the affected wheel-and-tire assembly.

In view of the economic and safety benefits of maintaining proper tire pressure, coupled with the general inconvenience of accomplishing such pressure maintenance and the inadequacies of prior art devices, it is apparent that a need is present for a dependable apparatus fully contained on a vehicle wheel or a portion thereof for maintaining proper inflation pressure within a mounted tire. Accordingly, a primary object of the present invention is to provide an automatic tire inflation device that is simple, inexpensive, practical and easy to install on an existing wheel.

Another object of the present invention is to provide a tire inflation device that can be added to existing wheels rather than requiring specially designed wheels for accommodation.

Yet another object of the present invention is to provide a tire inflation device wherein a valve stem also functions as an air inlet for inflation maintenance.

These and other objects of the present invention will become apparent throughout the description thereof which now follows.

SUMMARY OF THE INVENTION

The present invention comprises a device and method for maintaining desired inflation pressure within a tire mounted on a rotating wheel on a vehicle, utilizing repeated deformation of the tire where it contacts the ground. The device includes a small air compressor formed in or penetrating the rim of the wheel in communication with the pressurized tire, responsive to deformation of the tire where it contacts the ground to cause compressed air to flow into the tire. As such, desired air pressure in the tire is maintained directly from the normal rotation of the vehicle wheel by means entirely contained on the wheel.

Compressor construction includes a small reciprocating piston type compressor, having a cylinder adapted to receive a sliding piston responsive to deformation of the tire, forcing the piston inward on a compression stroke. Also included are input and output valves and an air intake channel. The compressor is oriented such that rotation of the wheel generates a centrifugal force on the piston forcing it radially outward on the intake stroke. The compressor also preferably includes an inlet passageway configured with a centrifugal intake valve, such that the inlet passageway is unsealed only when the wheel is rotating at a rate sufficient to prevent contaminants from entering therein by expelling them out the inlet passageway.

In one preferred embodiment, the compressor is mounted in, and part of, the wheel and includes a plunger in contact with the inside of the tire and slidably connected to the piston, and a spring disposed between the plunger and the piston. This mechanical arrangement enables a constant piston displacement responsive to a wide range of deformations of the tire. Such constant piston displacement provides a constant compression ratio producing a constant maximum pressure that prevents accumulation of excessive pressure in the tire regardless of the magnitude of tire deformation. The spring may also provide or add to the force during the intake stroke.

In a second preferred embodiment, a compressor device can be installed in a conventional wheel rather than requiring a specially configured wheel since the compressor with piston and valves resides in a small cylinder penetrateably mountable on the wheel rim. The piston is in communication with a compressible piston driver (e.g., a spring) having a distal end in contact with the inner floor of the mounted tire where the outside of the tire contacts the ground once every revolution. Repeated deformation of the rotating tire where it contacts the ground outside the distal end of the spring is transferred to the air compressor through a piston compression stroke. When such ground contact is not occurring, centrifugal force on the piston forces radial movement to accomplish the intake stroke of the piston. In this repetitious manner a small amount of air is forced into the tire during each rotation thereof in an analogous comparison to a trickle charge for a battery to maintain a full electrical charge thereof. By setting the maximum pressure produced by the compressor to the desired tire pressure, the pressure of compressed air delivered by the compressor will not exceed the desired tire pressure, thereby assuring against over-inflation of the tire. Alternatively, of course, a compression ratio can be provided that produces a pressure higher than the desired inflation pressure so long as a pressure relief valve is included to limit pressure build-up beyond desired inflation pressure. Such construction results in quicker realization of desired inflation pressure since more air is introduced during each revolution of the wheel.

In another embodiment, an inflation device likewise can be installed in a conventional wheel, with a valve stem functioning to permit air introduction for conventional high pressure rapid tire inflation as well as repetitious introduction of small amounts of air during vehicle motion for inflation maintenance. The device has a compressor and a valve stem that attaches to the compressor through the standard hole in the rim for a conventional valve stem. The valve stem houses a centrifugal valve and a centrifugal air intake channel controlled by a normally-open check valve. In addition to having the centrifugal air intake channel, the valve stem also has an external intake channel to accept a high-pressure air hose commonly employed in rapidly inflating a tire. As described above, centrifugal force developed when the wheel is rotating expels contaminants from the centrifugal intake channel while permitting air to enter the compressor. Compressor construction is identical to that described in relation to the compressor of the penetrateably mountable cylinder without the centrifugal valve.

The device and method of the present invention maintain desired inflation pressure within a rotating tire, utilizing only repeated deformation of portions of the tire contacting the ground to operate an air compressor. All components of the device are attached to the vehicle wheel, eliminating the need for any contact with the vehicle body or frame. Further aspects, objects and advantages will become apparent to those skilled in the art upon reading and understanding of the following detailed description and the accompanying drawings.

BRIEF DESCRIPTION OF THE DRAWINGS

FIG. 1 is a side view of a vehicle wheel and tire, including a cross-sectional view of the present invention formed therein;

FIG. 2 is a side view showing the deformed tire and air passing from the compressor into the tire;

FIG. 3 is a side view showing the wheel rotated 180° and air entering the compressor;

FIG. 4 is an enlarged side view of the compressor and the inlet and outlet passageways;

FIG. 5 is an enlarged front-sectional view of the device of the present invention;

DETAILED DESCRIPTION OF PREFERRED EMBODIMENTS

Figure 6:
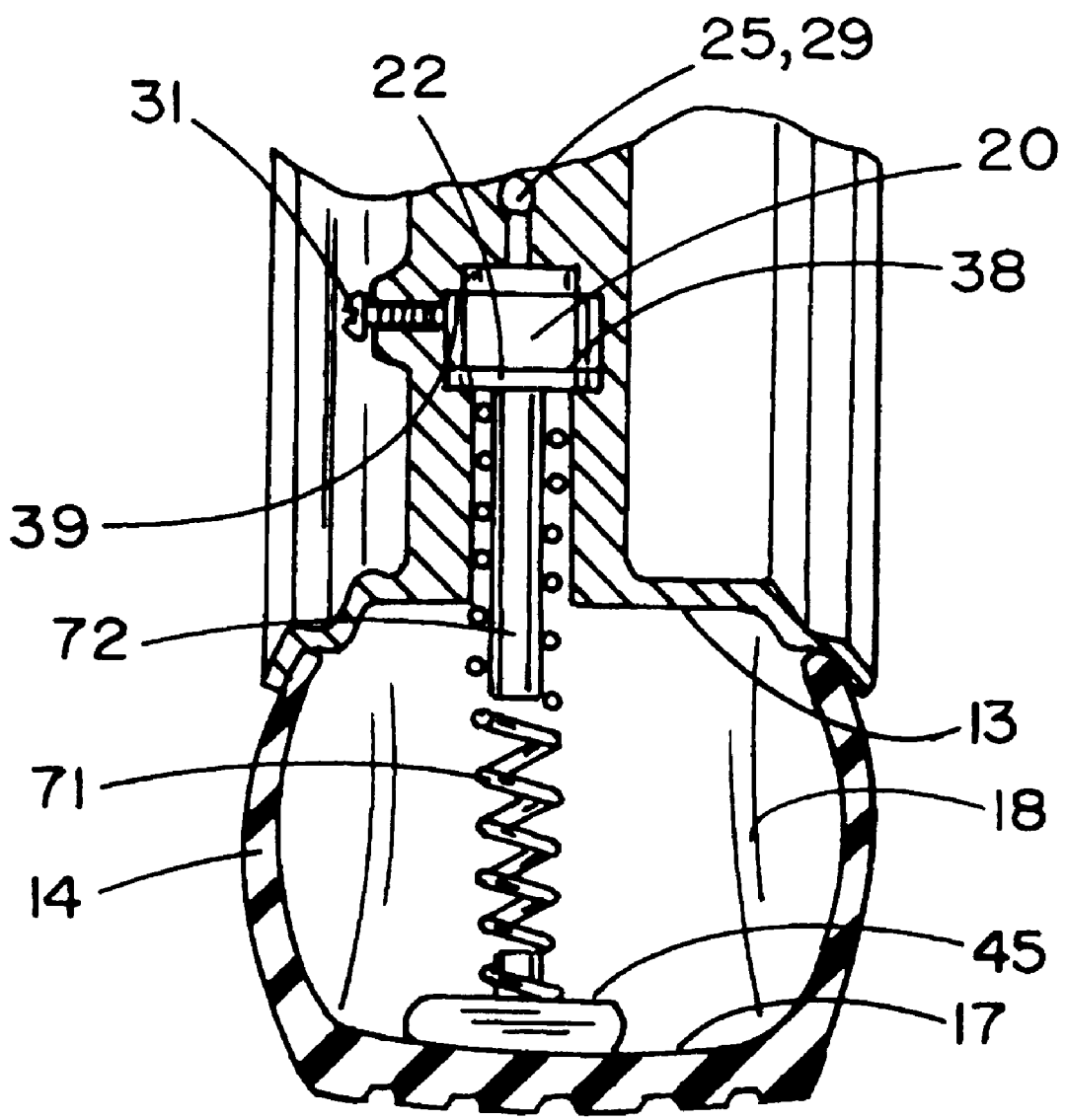
FIG. 6 is an enlarged side view of an alternative configuration of the present invention.
Figure 7:
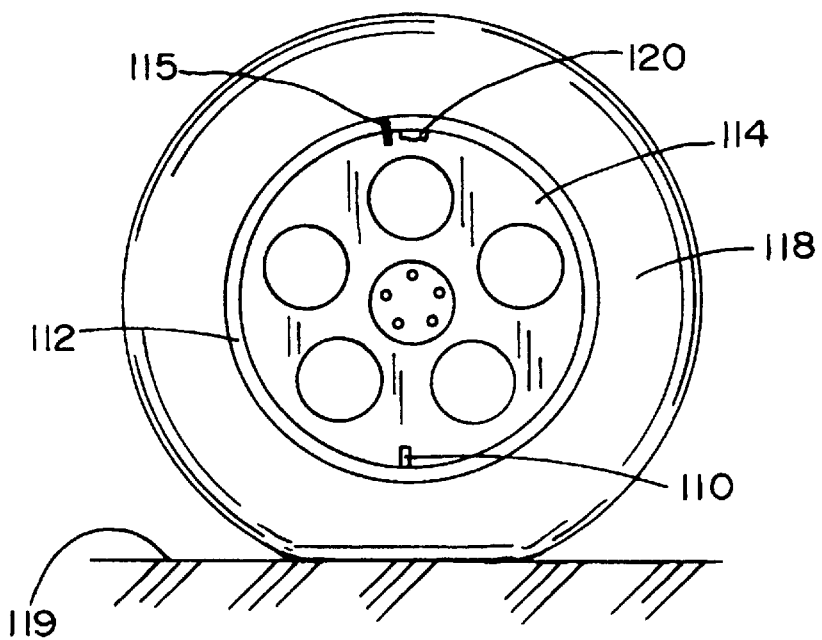
FIG. 7 is a side view of a vehicle wheel and tire showing another embodiment of the invention wherein a compressor is mounted on the rim of the wheel in communication with the interior of the tire.

The following detailed description and the accompanying drawings describe and illustrate four presently preferred embodiments of the invention only, and are not intended to limit the scope of the invention in any way.

The deformation-based tire inflation device 10 of the present invention is illustrated in FIGS. 1 through 5 which depict one preferred embodiment of the invention. Referring first to FIG. 1, the environment of the present invention is a wheel 12 that supports a tire 14 mounted to said wheel.

Now also referring to FIG. 5, the tire inflation device 10 includes a reciprocating piston type air compressor 20 built into the vehicle wheel 12, having a piston 22 slidably received within a plunger 40, having a spring foot 44 that contacts the inside surface 15 of the tire 14. When the vehicle wheel 12 is oriented such that the tire 14 contacts the ground where the spring foot 44 contacts the inside of the tire (see FIG. 2), the spring 42 causes the piston 22 to slide inward in the compressor 20, constituting a compression stroke. When such deformation of the tire 14 contacting the spring foot 44 is not present, centrifugal force causes the piston 22 to slide outward in the compressor 20, constituting an intake stroke (see FIG. 3).

The tire inflation device 10 also preferably includes a compression spring 42 captive inside the plunger 40 which the piston 22 bears against. Incorporation of the compression spring 42 and elongate plunger 40 allows the tire inflation device 10 to operate for a wide range of deformation of the deformed portion 16 of the tire 14 with a limited piston displacement, i.e., the device will still operate and not be damaged by the road surface even when the tire 14 is completely flat. A balancing weight 11 may be required to maintain the wheel 12 in balance. Though the tire inflation device 10 shown in FIGS. 1–6 is formed in the vehicle wheel 12, it is contemplated that the device 10 could be configured to be physically located within the tire 14 pressurized volume 18 adjacent the wheel 12 outboard rim 13, possibly through use of a collapsible spring to accommodate maximum deformation.

Now referring to FIG. 4, the air compressor 20 of the preferred embodiment of the present invention may be described. The compressor 20 includes an inlet passageway 24 through which air enters the compressor 20 cylinder 30. The compressor 20 also includes an outlet passageway 34 connected to the pressurized volume 18 of the tire 14. Contained in the inlet passageway 24 and outlet 34 passageway near the cylinder 30 are a pair of check valves 25, which provide one-way air flow from the intake orifice 26 and/or the cylinder 30 into the pressurized volume 18 of the tire 14. The check valves 25 each contain a solid neoprene ball 27 and a porous disc 29 (that allows air to flow through). The check valves 25 are arranged such that air is permitted to enter the inlet end and allowed to flow through the outlet end, as the disc 29 prevents the ball 27 from seating at the outlet end. The check valves 25 are also arranged such that centrifugal forces do not act upon the balls 27 to bias their movement.

The air compressor 20 further includes an adjustment screw 31 (see FIG. 5), located in the outside surface (O.S.) of the wheel 12 for accessibility. The adjustment screw 31 allows the minimum volume of the cylinder 30 of the compressor 20 to be manually varied, effectively changing the compression ratio of the compressor 20, thereby determining the maximum pressure applied to the pressurized volume 18 of the tire 14. Limiting the compression ratio of the compressor 20 limits the pressure generated by the compressor 20, preventing unintentional over inflation of the tire 14 and obviating use of a pressure relief valve. The adjustment screw 31 may be screwdriver operated to permit manual adjustments of the maximum pressure of the compressor 20, such an adjustment being calibrated with respect to nominal air pressure at sea level or some other base altitude. Although the description of the preferred embodiment assumes a compressor 20 comprising a cylinder 30 and a piston 22, the possibility of utilizing other types of compressors is contemplated, such as a bellows compressor, a diaphragm compressor, a linear compressor, or a rotary compressor.

The inlet passageway 24 preferably includes a centrifugal intake valve 50 and filter 52. A centrifugal intake valve 50 is preferably of a spring 53 and plug 51 configuration, the valve 50 being normally closed by the metal strip spring 53 forcing the plug 51 to seal the intake orifice 26 through which air enters the inlet passageway 24. The centrifugal force on the mass of the plug 51 opens the centrifugal intake valve 50 when the vehicle wheel 12 is rotating at a rate sufficient for the centrifugal force on potential liquid and particulate contaminants to expel such contaminants from the intake orifice 26 and surrounding area. The centrifugal intake valve 50 permits immersion of the wheel 12 in water without allowing water into the inlet passageway 24. Because of the especially adverse environment in which vehicle wheels 12 operate, as a further precaution, a conventional air filter 52 is included in the inlet passageway 24 between the centrifugal intake valve 50 and the inlet check valve 25 to reduce the likelihood of contaminants entering the compressor 20.

Now referring to FIGS. 2 through 5, the operation and use of the deformation-based tire inflation device 10 is more fully described. As the vehicle wheel 12 rotates, initially the portion of the tire 14 that the spring foot 44 contacts is not deformed and a centrifugal force is placed upon the compressor 20 piston 22 (FIG. 3). As the vehicle wheel 12 rotates, centrifugal force moves the piston 22 radially outward thereby enlarging the volume in the compressor 20 cylinder 30. The increased volume inside the cylinder 30 lowers the pressure to below the outside air pressure, thereby causing outside air to flow through inlet passageway 24 and into the cylinder 30. An outer stop 38 (FIG. 4) limits the outward movement of the piston 22 to control the maximum displacement of the intake stroke.

As the vehicle wheel 12 continues to rotate, the tire 14 contacts the ground and is deformed at the point at which the spring foot 44 contacts the tire 14 (FIG. 2). This causes the plunger 40 to slide inward radially. This inward motion is transferred to the piston 22 by means of the spring 42 until the piston 22 reaches the inner stop 39 (FIG. 4), after which the spring 42 compresses as the plunger 40 follows the full deformation of the tire. As the piston 22 and slides inward effectively reducing the volume in the compressor 20 cylinder 30, air in the compressor 20 cylinder 30 is pushed through the outlet passageway 34 and into the pressurized volume 18 of the tire 14. The compression spring 42 or other means disposed between the plunger 40 and the piston 22 make the piston 22 movement constant for a wide range of deformations of the tire 14.

Each intake stroke of the piston 22 causes the check valve 25 in the inlet passageway 24 to open, drawing air into the intake orifice 26 through the centrifugal intake valve 50, through the filter 52 and into the compressor 20 cylinder 30. Thereafter, as the piston 22 undertakes the compression stroke, the check valve 25 in the inlet passageway 24 closes, and the check valve 25 in the outlet passageway 34 opens and the air contained within the cylinder 30 is expelled into the pressurized volume 18 of the tire 14 unless the pressure in the tire equals or exceeds the pressure produced in the compressor 20.

Referring now to FIG. 6, according to a second embodiment of the present invention, the plunger 40 and spring 42 are replaced with a single structure referred to herein as the spring 71. The spring 71 functions in a manner similar to the separate spring 42 and plunger 40 discussed above.

Preferably, the spring 71 rides upon or generally encircles an optional piston rod 72 and abuts, at the distal most end thereof, a spring foot 45 abuts at the proximal end thereof, the piston 22. Thus, when the tire 14 deforms, the spring foot 45, which contacts the inside surface 17 of the tire 14, causes the spring 71 to move the piston inward in the compressor 20, as discussed above. The distance the piston 22 travels between stops 38 and 39 is less than the tire 14 deformation when its pressure is below the desired level. For example, in a typical passenger car tire 14, the distance between stops 38 and 39 may allow a piston movement of about 0.25 inch.

The length of the unstressed spring 71 preferably equals or is slightly less than the distance from the spring foot 45 to the lower stop 38 when the tire 14 is not deformed. Thus, when the tire 14 is not deformed, the spring 71 applies very little or no force to the piston 22. When the tire 14 deformation equals or exceeds the maximum piston movement between the upper stop 39 to the lower stop 38, then the piston 22 is urged radially inward to the upper stop 39, and the compressor 20 generates enough pressure to force a small amount of air into the tire volume 18 when the tire pressure is below the pressure in the compressor. When the tire 14 deformation exceeds the maximum piston movement between the lower stop 38 to the upper stop 39, then the spring compresses further with no effect on the piston 22 motion.

The spring foot 45 spreads out the area of the force applied by the spring 71 to the inner surface 17 of the tire 14. For example, if the compressor 20 generates 35 psi, and the piston 22 is 0.25 inches in diameter, or 0.049 square inches in area, then the force applied to the piston 22 is 35×0.049 or 1.72 pounds. Since this force is spread over the entire outer surface area of the spring foot 45, which may be four square inches, for example, the pressure increase on the tire 14 by the spring foot 45 is only 0.43 psi. If the maximum piston movement between the upper and lower stops 38 and 39 respectively is, for example, 0.25 inches, then the spring needs to apply a force of greater than 1.72 pounds for the first 0.25 inches of compression and need not apply any force for compressions greater than 0.25 inches. Optionally, the spring may be connected to the tire such that the piston is drawn out by the spring to produce an intake stroke in the cylinder when the tire returns to its non-deformed condition. Thus, according to this alternative configuration of the present invention, the spring 42 and the plunger 40 are combined so as to permit the compressor to be located closer to the wheel rim because the plunger does not have to accommodate the maximum tire deformation.

Figure 8:
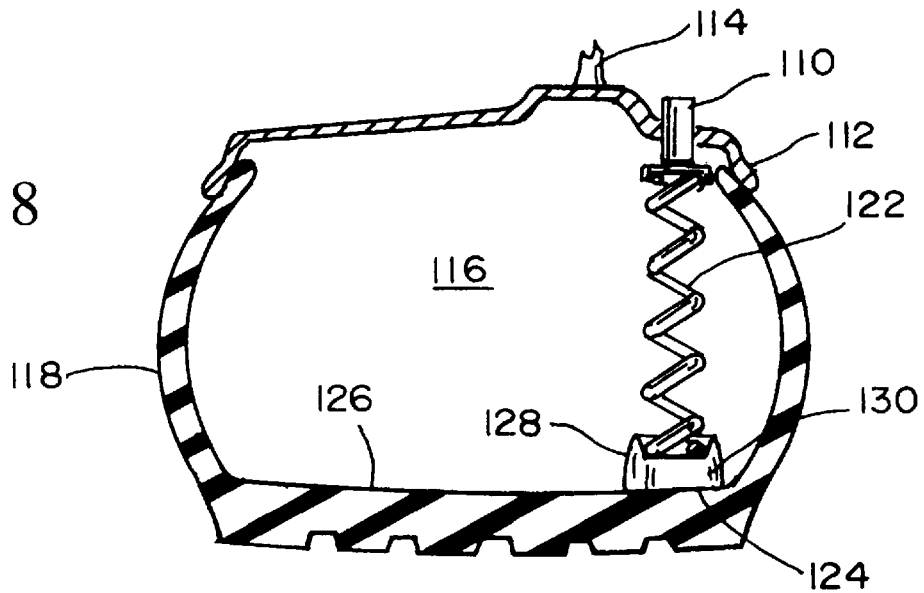
FIG. 8 is a front sectional view of the wheel and tire of FIG. 7 showing the rim-mounted compressor in internal communication with the floor of the tire.
Figure 9:
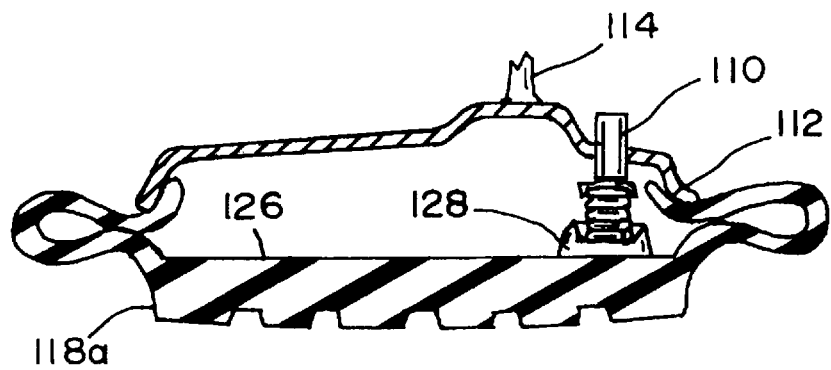
FIG. 9 is a front sectional view of the wheel and tire of FIG. 7 as in FIG. 8 except with the tire deflated.

Referring now to FIGS. 7–10, a third embodiment is illustrated that includes a compressor 110 mounted on a rim 112 of a wheel 114 to penetrate the interior 116 of an inflated tire 118 on a flat surface 119. The rim 112 includes a conventional valve stem 115 for conventional tire inflation. To maintain proper operational balance of the wheel 114 and mounted tire 118, a counterweight 120 can be applied on the rim 112 as known in the art. As shown in FIGS. 8 and 9, the compressor 110 is in connected communication with a piston driver which is preferably a piston drive spring 122 that extends from the compressor 110 to a site 124 on the floor 126 of the tire 118. The site 124 can include a spring foot 128 shaped to secure the distal end 130 of the spring 122 and adhered to the floor 126. FIG. 9 is included to illustrate that a deflated tire 118a does not cause breakage or harm to the compressor 110 because dimensions of the compressor 110 are such that accommodating clearance exists for both the compressed piston drive spring 122 and portion of the compressor 110 penetrating the rim 112.

Figure 10:
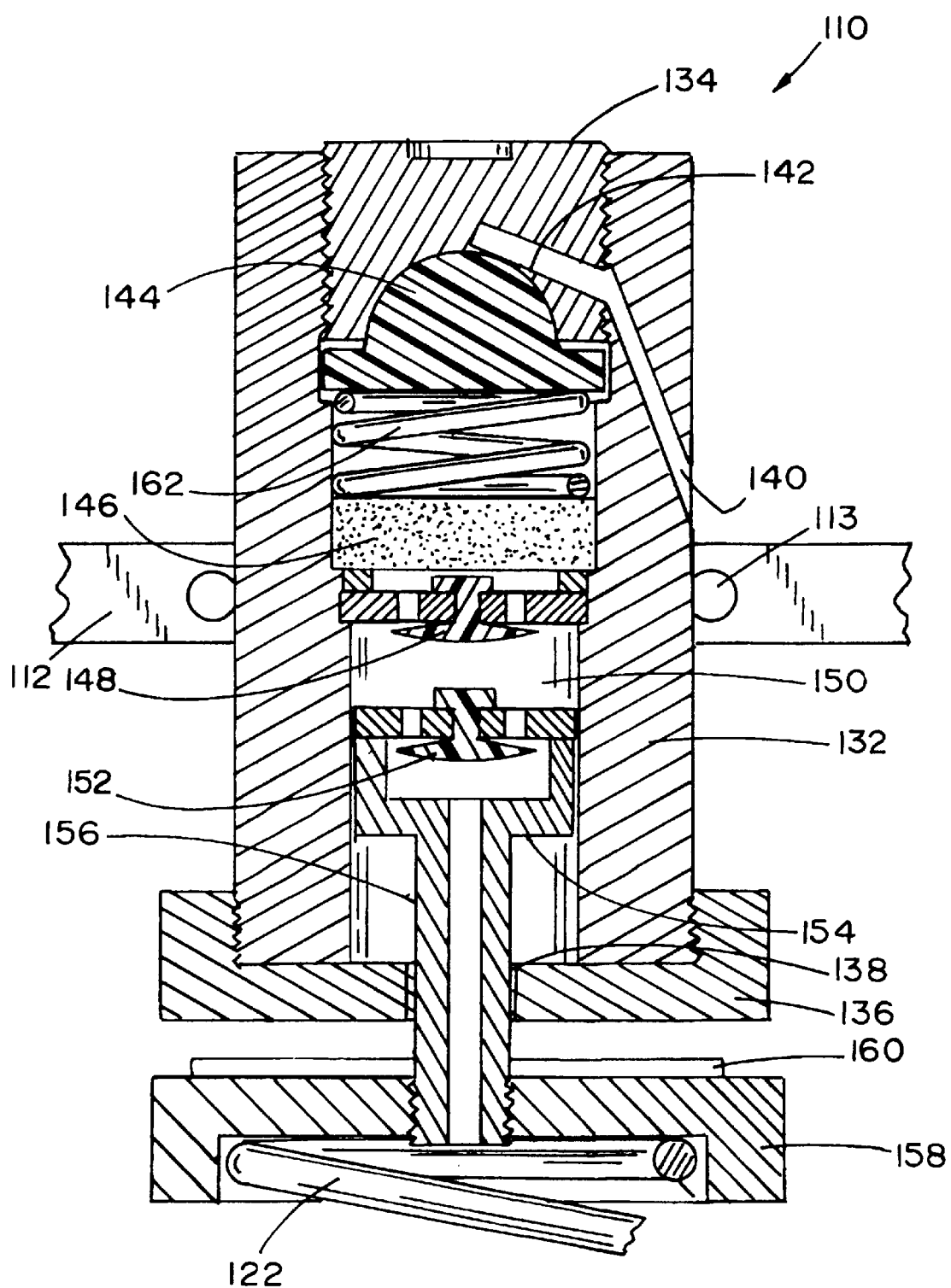
FIG. 10 is an enlarged cross section view of the rim-mounted compressor of FIGS. 7–9.

FIG. 10 illustrates in detail the construction of the compressor 110 whose preferred dimensions are about 0.75 inch diameter and 1.5 inch long. The compressor 110 is mounted through a rim 112 and there maintained by a conventional seal 113 as would be recognized in the art. The exterior housing of the compressor 110 includes a cylinder 132, end plug 134, and end cap 136 with piston guide 138. An air intake channel 140 terminates with an intake orifice 142 whose opening is controlled by a centrifugal valve 144 whose operation is described below. The travel path of air entering the interior 116 of the tire 118 for inflation thereof sequentially is the air intake channel 140, centrifugal intake valve 144, optional filter 146, input valve 148, compression chamber 150, output valve 152, and hollow piston rod 156 of the piston 154. A spring receptacle 158 mounted to the piston rod 156 receives the proximal end of the piston drive spring 122, while a shim 160 is mounted on the top of the spring receptacle 158 for adjusting piston travel distance and consequent compression ratio produced in the compression chamber 150, thereby determining the maximum pressure of air forced into the tire volume 116.

The centrifugal intake valve 144 opens at vehicle speeds above about 15 mph where a centrifugal force of about 7 G's exceeds the force of the valve spring 162 as the spring 162 attempts to keep the centrifugal intake valve 144 closed, while any liquid or solid particles are simultaneously centrifugally expelled from the radially disposed air intake channel 140. The air intake channel 140 generally precludes entry of contaminants into the compressor since the slanted cut thereof provides a broad path in which contaminants are less likely to lodge. When the centrifugal intake valve 144 opens, air flows there around to thereafter pass through the filter 146 which non-limitedly can be a sintered bronze porous disc for removal of any contaminants that may have entered despite the effects of centrifugal force on contaminant removal. While the centrifugal intake valve 144 is open, an intake stroke of the piston 154 which creates a partial vacuum in the compression chamber 150 thereby draws air therein through the intake valve 144. Early in the compression stroke the pressure in the compression chamber 150 exceeds atmospheric pressure and closes the intake valve 144. When pressure in the compression chamber 150 exceeds pressure in the tire interior 116 (FIG. 8), the output valve 152 in the piston 154 opens and compressed air from the compression chamber 150 is forced through the hollow piston rod 156 into the tire volume 116.

The drive spring 122 that couples tire deformation to piston motion permits a constant piston displacement regardless of the magnitude of tire deformation. In the preferred embodiment, the drive spring 122 has a width of 0.75 inch. Its proximal end is in contact with the receptacle 158 disposed on the end of the piston rod 156, while its distal end is retained within a foot 128 secured to the floor of the tire 118. Attachment of the foot 128, here having a diameter of 2.5 inches, can be conventionally accomplished as non-limitedly exemplified with glue, hook-and-loop, or other appropriate securement approach. With the dimensions here specified, the foot 128 spreads compression force over five square inches, thus applying less than one extra psi where the foot contacts the tire. Depending upon foot material chosen, which generally is not critical so long as the foot 128 can be secured to the floor of the tire 118, such material can be compressible (e.g. spongy) to thereby take up the first 0.25 inch or so movement and thus avoid unnecessary piston movement as can be caused by deformation of a properly inflated tire. If the unstressed length of the drive spring 122 equals or is less than the maximum distance between the foot 128 and the receptacle 158 when the piston 154 is fully withdrawn, the spring 122 will drive the intake stroke of the piston 154 when the point of the tire 118 under the foot 128 leaves contact with the ground. Centrifugal force will also drive the intake stroke. An alternative embodiment inverts the compression and intake strokes to thereby permit tire deformation to drive the intake stroke while centrifugal force would drive the compression stroke. Another alternative embodiment can combine the valve stem and compressor 110 into one composite device. This configuration has the advantage of a single hole through the rim, the installation of only one device, and lower weight than separate devices.

Figure 11:
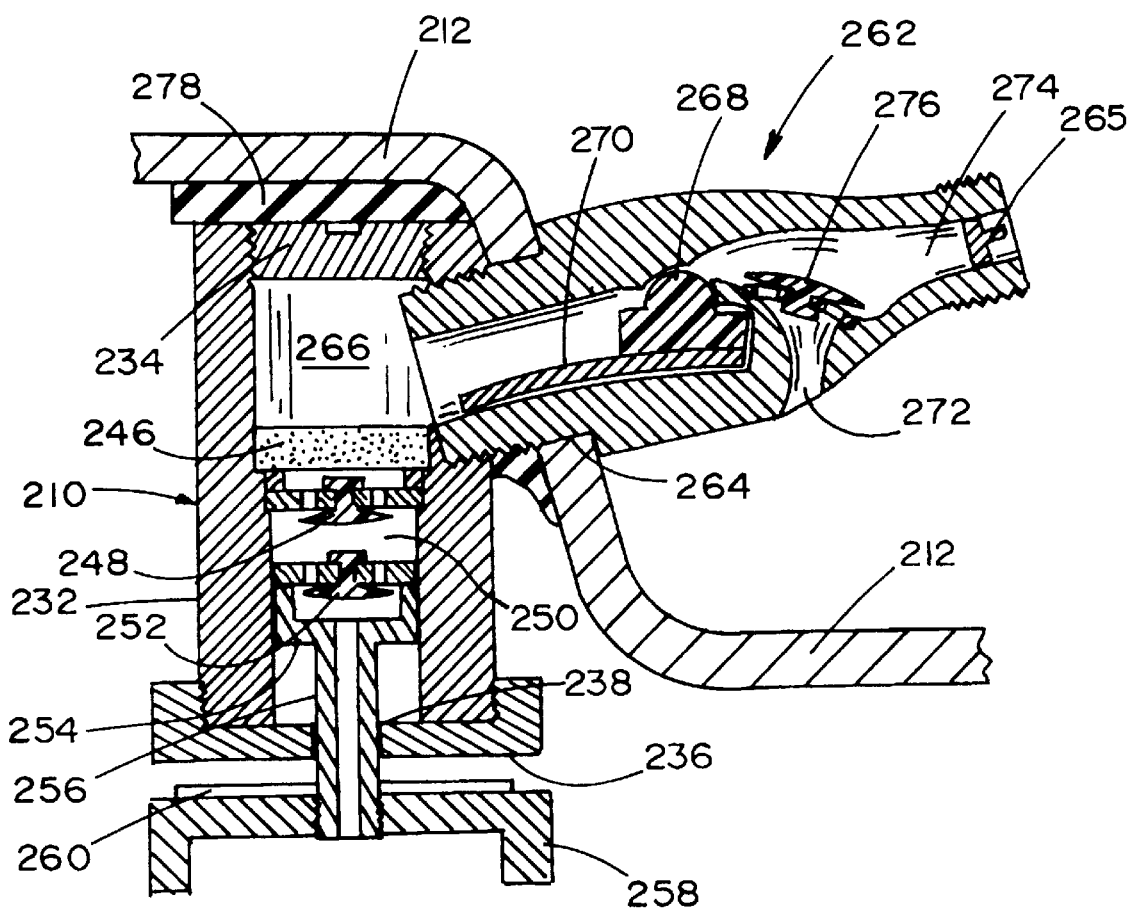
FIG. 11 is an enlarged cross section view of another embodiment of the invention wherein the compressor is connected to a modified valve stem.

FIG. 11 illustrates a fourth embodiment having a compressor 210 generally constructed internally identical to the compressor 110 of FIG. 10. Thus, the exterior housing of the compressor 210 includes a cylinder 232, end plug 234, and end cap 236 with a piston guide 238. Internal components include an optional filter 246, input valve 248, compression chamber 250, output valve 252, and hollow piston rod 256 of the piston 254. A pad 278 in sealed connection with the rim 212 can be provided to engage the end plug 234 and surrounding cylinder surface as shown. A spring receptacle 258 mounted to the piston rod 256 receives the proximal end of the piston drive spring (not shown), while a shim 260 is mounted on the top of the spring receptacle 258 for adjusting piston travel distance, all as described in relation to the device of FIG. 10.

Rather than having an air intake channel integral with the compressor cylinder as in the embodiment of FIG. 10, the embodiment of FIG. 11 receives air from a valve stem 262, thereby eliminating rim penetration of compressor housing as in the embodiment of FIGS. 7–10. Thus, the valve stem 262 enters conventionally through the standard opening 264 of the rim 112 into the cylinder 232 to empty into a compressor air receiving chamber 266. A centrifugal valve plug 268 in the valve stem 262 is held closed by a flat spring 270 to thereby become a type of flapper valve. Two conditions cause air entry through the valve stem 262. First, when the wheel is rotating rapidly enough to expel contaminants from a centrifugal intake channel 272 of the stem 262, centrifugal force on the plug 268 overcomes the force of the flat spring 270 to allow air flow from the centrifugal intake channel 272 to travel past both the normally open check valve 276 and the forced-open plug 268 into the air receiving chamber 266. Such air then travels into the compression chamber 250 for ultimate delivery to the tire interior in the same manner as described in relation to the embodiment of FIGS. 7–10. The second air-entry condition occurs when a high pressure inflation source (not shown) such as a standard air hose is introduced in a normal manner to the end of the stem 262 at the external intake channel 274. Applying such a high-pressure air flow forces open the conventional end valve 265 and the centrifugal valve plug 268 while closing the check valve 276 of the centrifugal intake channel 272. Such high pressure air flow also opens the input valve 248 and output valve 252 to thereby permit flow directly into the tire interior 116. As is apparent, when a valve stem 262 provides such dual functionality, advantages include a single hole through the rim, a lower total weight, and a simplified installation.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A wheel and tire assembly incorporating a device for maintaining inflation pressure within a tire interior by utilizing deformation of the tire upon revolving contact with the ground to cause passage of air into the tire interior, the assembly comprising:

a) a tire mounted on a wheel with a rim; and
b) an inflation pressure maintenance device comprising:
  1) a rim-mounted air compressor in communication with the tire interior, said compressor comprising:
    i) a generally cylindrical housing;
    ii) an air intake channel leading to an air intake orifice whose openability is controlled by a centrifugal-force operated valve;
    iii) an input valve downstream from the centrifugal-force operated valve and leading into an air compression chamber;
    iv) an output valve leading downstream from the compression chamber into the tire interior; and
    v) a piston disposed within the compression chamber; and
  2) a longitudinally movable and collapsible piston driver having a proximal end connected to the piston and a distal end in communication with a floor site of the tire interior, said piston driver movable longitudinally reciprocally in response to tire deformation caused when the tire floor site is deformed and restored once during each revolution of the tire in contact with a surface to thereby reciprocally move said piston to produce a fixed compression stroke.

2. A wheel and tire assembly as claimed in claim 1 wherein the piston driver of the inflation pressure maintenance device is a spring.

3. A wheel and tire assembly as claimed in claim 1 wherein the centrifugal-force operated valve of the inflation pressure maintenance device requires a centrifugal force sufficient for opening to expel potential contaminants within the intake channel.

4. A wheel and tire assembly as claimed in claim 1 wherein the air intake channel of the inflation pressure maintenance device is slanted laterally outwardly to permit centrifugal force to expel contaminants.

5. A wheel and tire assembly as claimed in claim 1 wherein the inflation pressure maintenance device comprises in addition a foot member secured to the tire floor site and with which the distal end of the piston driver is in contact.

6. A wheel and tire assembly as claimed in claim 1 wherein the inflation pressure maintenance device comprises in addition a filter disposed between the centrifugal-force operated valve and the input valve.

7. A wheel and tire assembly as claimed in claim 1 wherein the piston driver of the inflation pressure maintenance device is sufficiently longitudinally collapsible to reside within a space created between the tire when deflated and the rim.

8. A wheel and tire assembly incorporating a device for maintaining inflation pressure within a tire interior by utilizing deformation of the tire upon revolving contact with the ground to cause passage of air into the tire interior, the assembly comprising:

a) a tire mounted on a wheel with a rim; and
b) an inflation pressure maintenance device comprising:
  1) a generally cylindrical valve stem mounted generally perpendicularly to a wheel rim to supply air to a compressor disposed within the tire, said valve stem comprising:
    i) a first air intake that admits air from a high pressure air hose;
    ii) a second air intake channel that allows atmospheric air to enter radially inward with respect to the wheel;
    iii) a centrifugal valve normally held closed and opened by high pressure air through the first air intake channel and by centrifugal force when said wheel is rotating at a velocity to expel liquid and particulate contaminants radially outward from the second air intake channel; and
    iv) a check valve in the second air intake channel that is normally open and closeable by high pressure air entry through the first air intake channel; and
  2) an air compressor disposed within the tire, said compressor comprising:
    i) a generally cylindrical housing generally vertically oriented and having an upper end secured within the rim and an air receiving chamber in attached communication with the valve stem;
    ii) an input valve downstream from the air receiving chamber and leading into an air compression chamber;
    iii) an output valve leading downstream from the compression chamber into the tire interior;
    iv) a piston disposed within the compression chamber; and
    v) a longitudinally movable and collapsible piston driver having a proximal end connected to the piston and a distal end in communication with a floor site of the tire interior, said piston driver movable longitudinally reciprocally in response to tire deformation caused when the tire floor site is deformed and restored once during each revolution of the tire in contact with a surface to thereby reciprocally move said piston to produce a fixed compression stroke.

9. A device for maintaining inflation pressure as claimed in claim 8 wherein the piston driver is a spring.

10. A device for maintaining inflation pressure as claimed in claim 8 wherein the centrifugal-force operated valve requires a centrifugal force sufficient for opening to expel potential contaminants within the second intake channel.

11. A device for maintaining inflation pressure as claimed in claim 8 comprising in addition a foot member secured to the tire floor site and with which the distal end of the piston driver is in contact.

12. A device for maintaining inflation pressure as claimed in claim 8 comprising in addition a filter disposed immediately before the input valve.

* * * * *